US010903673B2

(12) United States Patent
Jung

(10) Patent No.: US 10,903,673 B2
(45) Date of Patent: Jan. 26, 2021

(54) BATTERY CHARGING METHOD AND BATTERY CHARGING APPARATUS

(71) Applicant: Samsung Electronics Co., Ltd., Suwon-si (KR)

(72) Inventor: Daeryong Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 15/400,490

(22) Filed: Jan. 6, 2017

(65) Prior Publication Data
US 2017/0194797 A1  Jul. 6, 2017

(30) Foreign Application Priority Data
Jan. 6, 2016  (KR) .......................... 10-2016-0001444

(51) Int. Cl.
*H02J 7/00* (2006.01)

(52) U.S. Cl.
CPC .............. *H02J 7/007* (2013.01); *H02J 7/008* (2013.01); *H02J 7/0047* (2013.01); *H02J 7/0086* (2013.01); *H02J 7/0088* (2013.01); *H02J 7/00711* (2020.01)

(58) Field of Classification Search
CPC .......... H02J 7/007; H02J 7/0047; H02J 7/008; H02J 7/0086; H02J 7/00711; H02J 7/0088
USPC .................................................. 320/162, 139
See application file for complete search history.

(56) References Cited

U.S. PATENT DOCUMENTS

| 5,617,007 | A | 4/1997 | Keidl et al. | |
| 2009/0146613 | A1* | 6/2009 | Yang ...................... | H02J 7/0014 320/139 |
| 2010/0219797 | A1* | 9/2010 | Veselic ................. | H02J 7/0068 320/162 |
| 2010/0264879 | A1 | 10/2010 | Lim et al. | |
| 2011/0285356 | A1* | 11/2011 | Maluf ................... | H02J 7/0052 320/139 |
| 2012/0200266 | A1 | 8/2012 | Berkowitz et al. | |

(Continued)

FOREIGN PATENT DOCUMENTS

| EP | 2 068 420 A2 | 6/2009 |
| JP | 7-298511 A | 11/1995 |

(Continued)

OTHER PUBLICATIONS

Extended European Search Report dated May 19, 2017 in counterpart European Patent Application No. 17150075.4 (9 pages in English).

*Primary Examiner* — Nathaniel R Pelton
(74) *Attorney, Agent, or Firm* — NSIP Law

(57) ABSTRACT

A battery charging method and corresponding apparatus include charging a battery based on an initial charging operation, and verifying whether a change event, with respect to a charging operation, occurs based on the charging of the battery. The battery charging method and corresponding apparatus also include changing the charging operation to an adjusted charging operation in response to verifying that the change event, with respect to the charging operation, occurs. The change event includes a physical quantity event in which a physical quantity of the battery sensed during a charging rest time of the initial charging operation is greater than or equal to a threshold physical quantity.

18 Claims, 10 Drawing Sheets

(56) References Cited

U.S. PATENT DOCUMENTS

2013/0038297 A1* 2/2013 Sang .................. H02J 7/0073
320/145
2014/0021959 A1 1/2014 Maluf et al.
2016/0272080 A1* 9/2016 Chang .................. B60L 53/60

FOREIGN PATENT DOCUMENTS

JP 11-307134 A 11/1999
JP 2002-199605 A 12/2002

* cited by examiner

FIG. 5

$M^{th}$ cycle

| | Physical quantity data | Current value |
|---|---|---|
| $1^{st}$ | X | $I_{M,1}$ |
| $2^{nd}$ | X | $I_{M,2}$ |
| $3^{rd}$ | O | $I_{M,3}$ |
| $4^{th}$ | O | $I_{M,4}$ |
| $5^{th}$ | O | $I_{M,5}$ |
| ⋮ | ⋮ | ⋮ |
| $N_S\text{-}2^{th}$ | O | $I_{M,N_S-2}$ |
| $N_S\text{-}1^{th}$ | X | $I_{M,N_S-1}$ |
| $N_S^{th}$ | X | $I_{M,N_S}$ |

$(M+1)^{th}$ cycle

| | Physical quantity data | Current value |
|---|---|---|
| $1^{st}$ | - | - |
| $2^{nd}$ | - | - |
| $3^{rd}$ | - | - |
| $4^{th}$ | - | - |
| $5^{th}$ | - | - |
| ⋮ | ⋮ | ⋮ |
| $N_S\text{-}2^{th}$ | - | - |
| $N_S\text{-}1^{th}$ | - | - |
| $N_S^{th}$ | - | - |

BATTERY CHARGING METHOD AND BATTERY CHARGING APPARATUS

CROSS-REFERENCE TO RELATED APPLICATION(S)

This application claims the benefit under 35 USC 119(a) of Korean Patent Application No. 10-2016-0001444, filed on Jan. 6, 2016, in the Korean Intellectual Property Office, the entire disclosure of which is incorporated herein by reference for all purposes.

BACKGROUND

1. Field

The following description relates to a battery charging method and a battery charging apparatus.

2. Description of Related Art

Batteries are charged using various methods. For example, a constant current-constant voltage charging method charges a battery with constant currents, and charges the battery at a constant voltage when a voltage of the battery reaches a preset level. A varying current decay charging method charges a battery with high currents at a low state of charge (SOC), and gradually reduces the currents when the battery has a predetermined SOC by charging. In addition to the aforementioned methods, a fast charging method that reduces a charging time of a battery is used. However, when fast charging of a battery is frequently performed, the life of the battery decreases. Thus, an apparatus and a method are needed that can perform fast charging without significantly decreasing the life of the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a battery charging method, including: charging a battery based on an initial charging operation; verifying whether a change event, with respect to a charging operation, occurs based on the charging of the battery; and changing the charging operation to an adjusted charging operation in response to verifying that the change event, with respect to the charging operation, occurs, wherein the change event may include a physical quantity event in which a physical quantity of the battery sensed during a charging rest time of the initial charging operation is greater than or equal to a threshold physical quantity.

A current value of the adjusted charging operation may be less than a current value of the initial charging operation.

The change event may further include a time event in which a charging time of the battery is greater than or equal to a duration corresponding to the initial charging operation.

The sensed physical quantity may include a voltage sensed during the charging rest time.

The sensed physical quantity may include a physical quantity sensed during the charging rest time after the battery is discharged.

The changing of the charging operation may include terminating the initial charging operation in response to the sensed physical quantity being greater than or equal to the threshold physical quantity.

The battery charging method of claim 1, may further include: charging the battery in a slow charging mode prior to the battery being charged during the initial charging operation.

The charging of the battery in the slow charging mode may include: comparing another sensed physical quantity of the battery to a preset physical quantity, and in response to the another sensed physical quantity exceeding the preset physical quantity, determining a start operation of the charging operation based on the another sensed physical quantity and charging the battery with a constant current for a period of time, wherein, in response to the period of time expiring, the charging of the battery based on the initial charging operation may include charging the battery based on the initial charging operation determined to be the start operation.

The charging of the battery in the slow charging mode may include: comparing another sensed physical quantity of the battery to a preset physical quantity; and in response to the another sensed physical quantity being less than or equal to the preset physical quantity, charging the battery with a constant current, wherein, in response to the another sensed physical quantity of the battery charged with the constant current exceeding the preset physical quantity, the charging of the battery based on the initial charging operation may include charging the battery based on the initial charging operation corresponding to a first charging operation of the charging operation.

A current value of the initial charging operation may be determined before the initial charging operation is initiated, in response to verifying that the change event occurs, the current value of the initial charging operation may be determined to be less than a corresponding current value of a corresponding charging operation included in a charging cycle, which is previous to a charging cycle including the initial charging operation, in response to verifying that the change event may be absent, the current value of the initial charging operation may be determined to be equal to the corresponding current value, and the corresponding charging operation may correspond to the initial charging operation.

The change event may include at least one of: a voltage event in which a maximum voltage of the battery charged based on the corresponding charging operation is greater than or equal to a preset voltage, an over-potential event in which an over-potential of the battery charged based on the corresponding charging operation is greater than or equal to a preset over-potential, and a ratio event in which a ratio of a variance in the over-potential to a variance in a relaxation voltage is greater than or equal to a ratio, wherein the relaxation voltage is a voltage of the battery sensed during a charging rest time of the corresponding charging operation, and the over-potential is a difference between the voltage of the battery charged based on the corresponding charging operation and the relaxation voltage.

The initial charging operation and the adjusted charging operation may be included in a pulse charging mode, in which a pulse current is applied to a battery.

In accordance with another embodiment, there is provided a charging current determining method, including: verifying whether physical quantity data corresponding to a target charging operation is present; in response to verification that the physical quantity data is present, determining a corresponding current value of a corresponding charging operation included in a charging cycle, subsequent to another charging cycle including the target charging operation, based on a current value of the target charging operation;

and in response to verifying that the physical quantity data is present, verifying whether a current change event occurs based on the physical quantity data, wherein the corresponding charging operation corresponds to the target charging operation.

The charging current determining method may further include: determining an over-potential indicating a difference between a voltage of the battery and a relaxation voltage sensed during a charging rest time of the target charging operation based on the physical quantity data.

The current change event may include at least one of: a voltage event in which a maximum voltage of the battery is greater than or equal to a preset voltage, an over-potential event in which the over-potential is greater than or equal to a preset over-potential, and a ratio event in which a ratio of a variance in the over-potential to a variance in the relaxation voltage is greater than or equal to a ratio.

In response to verifying that the current change event occurs, the corresponding current value may be determined to be less than the current value of the target charging operation, and in response to verification that the current change event is absent, the corresponding current value may be determined to be equal to the current value of the target charging operation.

In response to verification that the physical quantity data being absent, the corresponding current value may be determined to be equal to the current value of the target charging operation.

The target charging operation and the corresponding charging operation may be included in a pulse charging mode in which a pulse current is applied to a battery.

In accordance with another embodiment, there is provided a battery charging apparatus, including: an interface configured to receive a sensed physical quantity of a battery; and a controller configured to charge the battery based on an initial charging operation, verify whether a change event with respect to a charging operation occurs based on the charging of the battery, and change the charging operation to an adjusted charging operation in response to verifying that the change event with respect to the charging operation occurs, wherein the change event may include a physical quantity event in which a physical quantity of the battery sensed during a charging rest time of the initial charging operation is greater than or equal to a threshold physical quantity.

The change event may include a ratio of a difference between a maximum over-potential and a minimum over-potential, and a difference between a maximum relaxation voltage and a minimum relaxation voltage, the relaxation voltage may be a voltage of the battery sensed during a charging rest time of a corresponding charging operation, and the over-potential may be a difference between a voltage of the battery charged based on the corresponding charging operation and the relaxation voltage.

Other features and aspects will be apparent from the following detailed description, the drawings, and the claims.

BRIEF DESCRIPTION OF THE DRAWINGS

FIG. 5 illustrates an example of a charging current determining method, in accordance with an embodiment.

Figure 1:
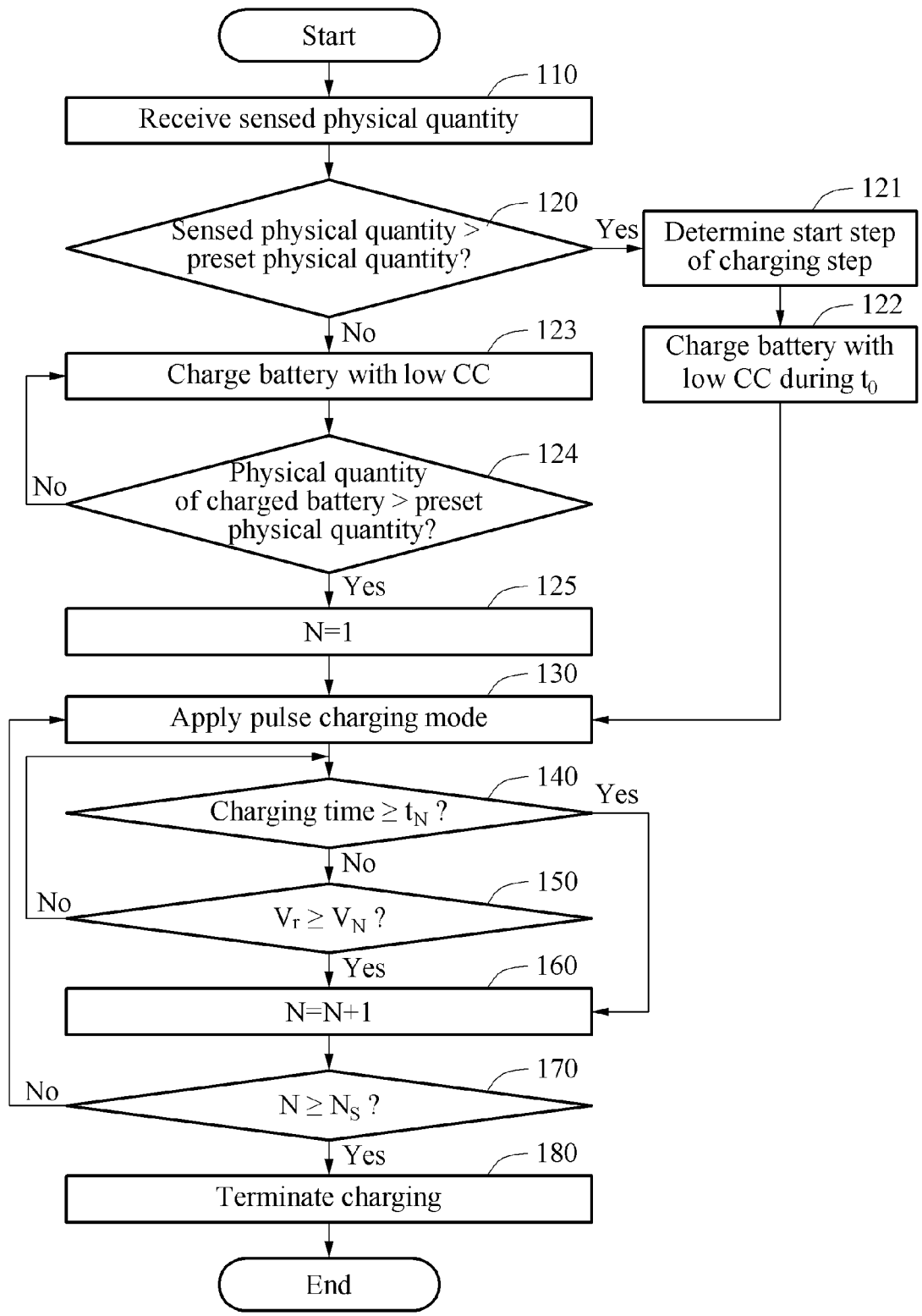
FIG. 1 is a flowchart illustrating an example of a battery charging method, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a flowchart illustrating an example of a battery charging method, in accordance with an embodiment.

A battery charging method of FIG. 1 is performed by a battery charging apparatus.

Referring to FIG. 1, in operation 110, the battery charging apparatus receives a sensed physical quantity of a battery. For example, a voltage sensor senses a voltage of the battery, and transmits the sensed voltage to the battery charging apparatus.

In operation 120, the battery charging apparatus compares the sensed physical quantity to a preset physical quantity. For example, the battery charging apparatus compares the sensed voltage to a first preset voltage $V_0$, for example, 3.35 volts (V). In an embodiment, the battery charging apparatus includes a memory or storage configured to store preset physical quantities. In another embodiment, the battery charging apparatus transmits an inquiry request to an external memory or storage to receive, in response to the inquiry request, the preset physical quantity associated with the battery. In response to the sensed physical quantity exceeding the preset physical quantity, in operation 121, the battery charging apparatus determines a start operation of a charging operation based on the sensed physical quantity. For example, the battery charging apparatus determines the start operation by referring to Table 1 which is stored in the memory.

TABLE 1

| Charging operation | Current (C) | Time (min) | Voltage (V) |
|---|---|---|---|
| N = 1 | 5 | 10 | 3.40 |
| N = 2 | 4.5 | 5 | 3.70 |
| N = 3 | 4 | 5 | 3.77 |
| N = 4 | 3.5 | 5 | 3.85 |
| N = 5 | 3 | 10 | 3.91 |
| N = 6 | 2 | 10 | 3.99 |
| N = 7 | 1.5 | 10 | 4.06 |
| N = 8 | 1 | 10 | 4.12 |

In one example, in response to the sensed voltage being 3.6 V, the battery charging apparatus compares the sensed voltage to voltages listed in Table 1. The sensed voltage is greater than a voltage of a first charging operation N=1 and less than a voltage of a second charging operation N=2. Thus, the battery charging apparatus determines the second charging operation N=2 to be the start operation. In a case in which there are $N_s$ charging operations, the battery charging apparatus determines to initiate charging, starting from an N-th charging operation based on the sensed voltage.

Table 1 is provided as one embodiment or illustrative example, and thus information needed to determine a charging operation is not limited thereto.

In response to the start operation being determined, in operation 122, the battery charging apparatus charges the battery with a low constant current (CC) $I_0$, for example, 0.04 amperes (A), during a predetermined time period $t_0$, for example, for 1 minute (min).

In response to the sensed physical quantity being less than or equal to the preset physical quantity, the battery charging apparatus charges the battery until the physical quantity of the battery reaches the preset physical quantity. For example, in response to the sensed voltage being less than or equal to $V_0$, the battery charging apparatus charges the battery until the voltage of the battery reaches $V_0$. In detail, in operation 123, the battery charging apparatus charges the battery with a low CC, for example, $I_0$ mentioned above. In operation 124, the battery charging apparatus compares a physical quantity of the battery charged with the CC charging to the preset physical quantity. In an example, in response to the physical quantity of the battery charged with the CC charging exceeding the preset physical quantity, in operation 125, the battery charging apparatus determines to initiate charging, starting from a first charging operation. Conversely, in response to the physical quantity of the battery charged with the CC charging being less than or equal to the preset physical quantity, the battery charging apparatus charges the battery with the low CC. The battery charging apparatus iteratively performs operations 123 and 124 until the physical quantity of the battery reaches the preset physical quantity.

The descriptions provided above are related to an operation of the battery charging apparatus to which a slow charging mode is applied. The battery charging apparatus charges the battery in the slow charging mode to, in one embodiment, alleviate an internal shock of the battery. The battery is previously charged in the slow charging mode, and the battery charging apparatus applies a fast charging mode. The fast charging mode includes, for example, a pulse charging mode. Hereinafter, descriptions will be provided based on a case in which the fast charging mode is the pulse charging mode.

In operation 130, the battery charging apparatus applies a pulse charging mode. The pulse charging mode includes the plurality of charging operations described above. In response to the pulse charging mode being applied, the battery charging apparatus applies a pulse current to the battery.

The battery charging apparatus charges the battery based on an initial charging operation of the pulse charging mode. In an example, the initial charging operation is determined before the pulse charging mode is applied. As described above, the initial charging operation may be a first charging operation or an N-th charging operation of the pulse charging mode. For example, in a case in which the initial charging operation corresponds to the first charging operation, the battery is charged at 5 current rate (C-rate) by referring to Table 1. In one embodiment, C-rate is expressed by (charging current)/(battery capacity). Further, in a case in which the initial charging operation corresponds to a third charging operation, the battery is charged at 4 C-rate.

The battery charging apparatus verifies whether a change event with respect to a charging operation occurs. The change event includes at least one of a time event in which a charging time of the battery is greater than or equal to a duration corresponding to the initial charging operation and a physical quantity event in which a physical quantity of the battery sensed during a charging rest time of the initial charging operation is greater than or equal to a threshold physical quantity.

In an example, the battery charging apparatus verifies whether a time event occurs. In an example, in operation 140, the battery charging apparatus verifies whether a charging time is greater than or equal to a duration corresponding to the initial charging operation. In response to verification that the charging time is greater than or equal to the duration corresponding to the initial charging operation, the battery charging apparatus updates an index of the charging operation, in operation 160. The battery charging apparatus changes the charging operation from the initial charging operation to an adjusted charging operation.

In response to verification that the charging time is less than the duration corresponding to the initial charging operation, the battery charging apparatus verifies whether a physical event occurs. In detail, in operation 150, the battery charging apparatus verifies whether a physical quantity of the battery sensed during a charging rest time of the initial charging operation is greater than or equal to a threshold physical quantity. The physical quantity of the battery sensed during the charging rest time includes a relaxation voltage $V_r$. The battery is not charged during the charging rest time. In other words, a pulse current may not be applied to the battery or the battery may discharge at least some voltage during the charging rest time. $V_r$ denotes a voltage of a battery to which a pulse current is not applied or a voltage of a discharged battery. The battery charging apparatus compares $V_r$ to a second preset voltage $V_n$. In response to $V_r$ being greater than or equal to $V_n$, the battery charging apparatus terminates the initial charging operation and proceeds to operation 160. In operation 160, the battery charging apparatus updates the index of the charging operation. The battery charging apparatus changes the charging operation from the initial charging operation to the adjusted charging operation.

In the example of FIG. 1, descriptions are provided based on a case in which whether a time event occurring is verified, and whether a physical quantity event occurring is verified in response to verification that the time event does not occur. However, examples are not limited thereto. In another example, the battery charging apparatus verifies whether a physical quantity event occurs, and verifies whether a time event occurs in response to verification that the physical quantity event does not occur. In still another example, the battery charging apparatus verifies whether a physical quantity event occurs, irrespective of whether a time event occurs. In yet another example, the battery charging apparatus verifies whether a time event occurs, irrespective of whether a physical quantity event occurs.

In operation 170, the battery charging apparatus verifies whether the updated N is greater than or equal to the number $N_s$ of charging operations of the pulse charging mode. In response to verification that the updated N is less than $N_s$, the battery charging apparatus charges the battery based on the adjusted charging operation. When the battery is charged based on the adjusted charging time, operations 140 through 170 are iteratively performed.

Conversely, in operation 180, in response to verifying that the updated N is greater than or equal to $N_s$, the battery charging apparatus terminates charging the battery.

Figure 2:
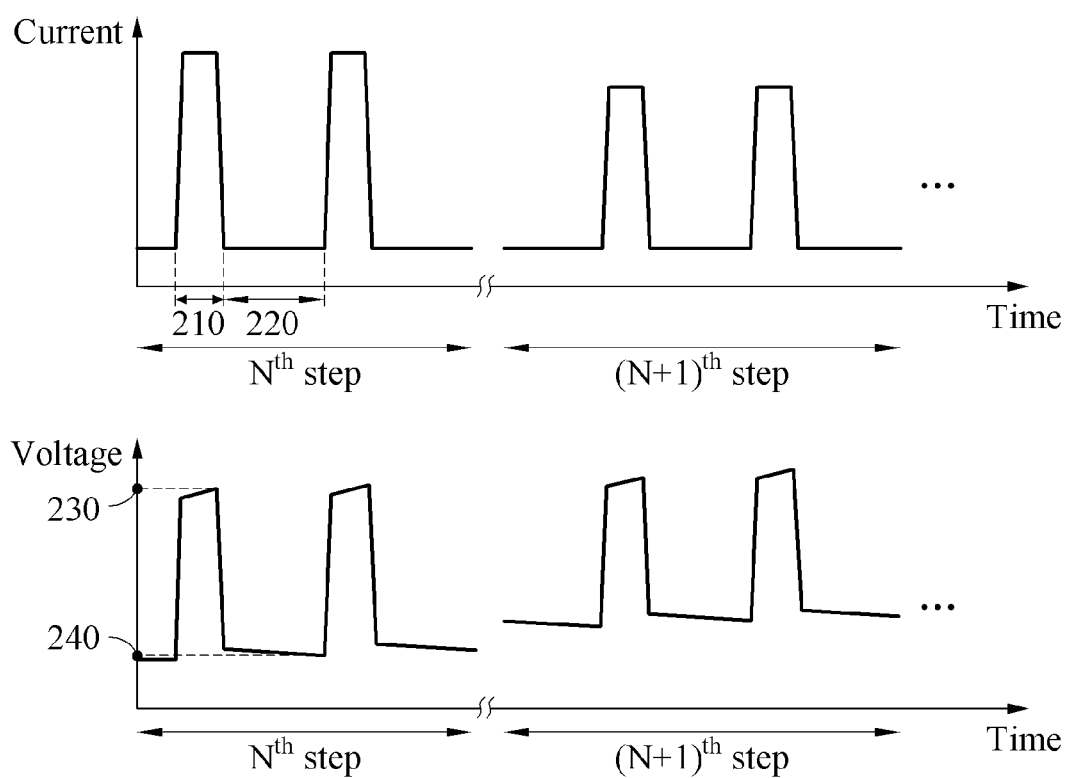
FIG. 2 illustrates an example of a pulse charging mode, in accordance with an embodiment.

FIG. 2 illustrates an example of a pulse charging mode, in accordance with an embodiment.

Referring to FIG. 2, a waveform of a pulse current applied to a battery and a waveform of a voltage of the battery are illustrated.

A pulse charging mode includes a plurality of charging operations. Each of the plurality of charging operations includes at least one pulse period and at least one charging rest period. In one example, the pulse period corresponds to a pulse time 210, and the charging rest period corresponds to a charging rest time 220.

The pulse current applied to the battery has a current waveform as shown in FIG. 2. In the example of FIG. 2, an N-th charging operation includes two pulse periods. The number of pulse periods included in the N-th charging operation is provided as one example, and various embodiments are not limited thereto. The battery includes a rechargeable secondary cell. For example, the battery is a lithium-ion battery. In response to the pulse charging mode being applied, a battery charging apparatus applies a high current to the lithium-ion battery during the pulse time 210. Lithium ions of the battery are inserted into a cathode. A relatively large portion of the lithium ions are distributed on a surface of the cathode, rather than being distributed uniformly in the entire cathode. In a case in which a relatively large portion of the lithium ions are distributed on the surface of the cathode, the cathode is plated with lithium. However, in such case in which the cathode is plated with lithium, a degradation rate of the battery increases. To prevent an increase in the degradation rate of the battery, the pulse charging mode includes the charging rest time 220. As described with reference to FIG. 1, the battery charging apparatus does not apply the pulse current to the battery during the charging rest time 220. The lithium ions are diffused into the cathode during the charging rest time 220. Further, the battery is discharged during the charging rest time 220. In response to the battery being discharged during the charging rest time 220, the lithium ions are diffused into the cathode faster.

A voltage of the battery charged based on the N-th charging operation has a voltage waveform as shown in FIG. 2. A pulse voltage 230 of the battery indicates a voltage of the battery during the pulse time 210. $V_r$ 240 of the battery indicates a voltage of the battery sensed during the charging rest time 220. In an example, a voltage sensor senses a voltage of the battery a predetermined number of times, for example, one time, during the pulse time 210. The sensed pulse voltage 230 represents voltages of the battery sensed during the pulse time 210. Further, the voltage sensor senses a voltage of the battery a predetermined number of times, for example, one time, during the charging rest time 220. The sensed $V_r$ 240 represents voltages of the battery sensed during the charging rest time 220. In doing so, a size of sensed data decreases, and a data processing rate increases.

The pulse voltage 230 and $V_r$ 240 of FIG. 2 are provided as one example, and various embodiments are not limited thereto.

An over-potential of the battery indicates a difference between the pulse voltage 230 and $V_r$ 240. When the pulse time 210 and the charging rest time 220 are referred to as pulse packets or pulse periods, the over-potential of the battery indicates a difference between $V_r$ 240 and the pulse voltage 230 sensed during the pulse packets or the pulse periods.

As a charging cycle repeats, the battery is degraded. In a case in which the same charging profile is continuously applied to the degraded battery, the degradation rate of the battery increases, and the life of the battery decreases less than an expected life. To address such deficiency, the battery charging apparatus charges the battery by applying different charging profiles within a charging cycle. As shown in the example of FIG. 2, a current value of an (N+1)-th charging operation is less than a current value of the N-th charging operation. As an index of the charging operation increases, a current value corresponding to the charging operation decreases. By applying a different charging profile in each charging operation, the battery degrades relatively slow, and the life of the battery increases.

Figure 3:
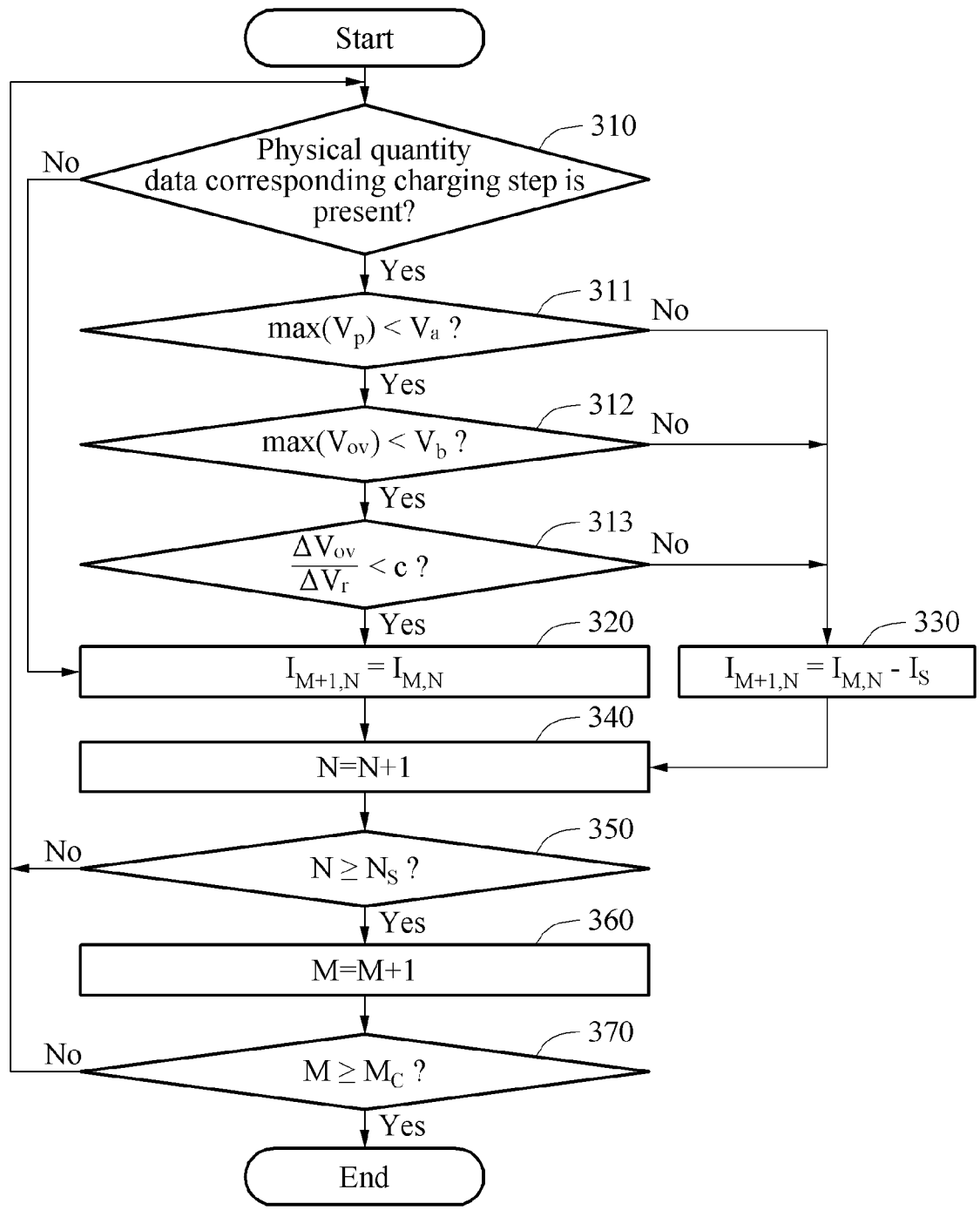
FIG. 3 is a flowchart illustrating an example of a charging current determining method, in accordance with an embodiment.

FIG. 3 is a flowchart illustrating an example of a charging current determining method, in accordance with an embodiment.

A charging current determining method of FIG. 3 is performed by a charging current determining apparatus. The charging current determining apparatus is included in the battery charging apparatus described above. Further, the charging current determining apparatus is an apparatus physically distinct from the battery charging apparatus. In alternative configuration, the charging current determining apparatus and the battery charging apparatus may be embodied on a single structural processor or controller to perform the functions illustrated and described with respect to FIGS. 1 and 3.

The charging current determining apparatus determines a current value of an N-th charging operation, hereinafter, the corresponding charging operation, of an (M+1)-th charging cycle of a pulse charging mode. The current value of the corresponding charging operation is based on a current value of an N-th charging operation, hereinafter, the target charging operation, of an M-th charging cycle of the pulse charging mode. The pulse charging mode is defined as a charging mode in which a pulse current is applied to a battery, as described above. Hereinafter, descriptions will be provided in detail with reference to FIG. 3.

Referring to FIG. 3, in operation 310, the charging current determining apparatus verifies whether physical quantity data corresponding to a target charging operation is present. In one embodiment, the target charging operation is one of the charging operations of the pulse charging mode described above.

The physical quantity data corresponding to the target charging operation includes, for example, one of a voltage, a current, a temperature, and an impedance of a battery charged during the target charging operation or a combination thereof.

The M-th charging cycle is a partial charging cycle. In this example, the battery is not charged during a predetermined charging operation, and thus physical quantity data corresponding to the N-th charging operation, for example, the target charging operation defined above, is absent. Further, the battery has a high SOC at a start of the M-th charging cycle. In this example, the battery is charged starting from an (N+1)-th charging operation, and the physical quantity data corresponding to the target charging operation is absent. In a case in which the physical quantity data corresponding to the target charging operation is absent, the charging current determining apparatus determines a corresponding current value to be a current value of the target charging operation. In operation 320, the charging current determining apparatus determines $I_{M+1,N}$ to be $I_{M,N}$. In one example, $I_{M+1,N}$ denotes the corresponding current value and, $I_{M,N}$ denotes the current value of the target charging operation.

In a case in which the physical quantity data corresponding to the target charging operation is present, the charging current determining apparatus verifies whether a current change event occurs based on the physical quantity data. The current change event includes at least one of a voltage event in which a maximum pulse voltage of the battery is greater than or equal to a preset pulse voltage, an over-potential event in which an over-potential of the battery is greater than or equal to a preset over-potential, and a ratio event in which a ratio of a variance in the over-potential to a variance in a relaxation voltage is greater than or equal to a predetermined ratio.

In an example, in a case in which the physical quantity data is present, the charging current determining apparatus verifies whether a voltage event occurs based on the physical quantity data. For example, the charging current determining apparatus verifies a maximum pulse voltage $max(V_p)$ of the battery charged during the target charging operation. In operation 311, the charging current determining apparatus verifies whether $max(V_p)$ is less than a preset pulse voltage $V_a$, which is, for example, 4.3 V. In response to verification that $max(V_p)$ is greater than or equal to $V_a$, the charging current determining apparatus determines $I_{M+1,N}$ to be $I_{M,N}-I_s$. The corresponding current value is determined to be less than the current value. $I_s$ is, for example, 0.1 C-rate. In a case in which a lithium-ion battery is charged based on the pulse charging mode, a cathode of the lithium-ion battery is plated with lithium. In one example, a thermodynamic condition of lithium plating is a potential of the cathode exceeding "0". The comparison between $max(V_p)$ and $V_a$ is performed to avoid the thermodynamic condition of lithium plating in a subsequent charging cycle. In response to verification that $max(V_p)$ being less than $V_a$, the charging current determining apparatus verifies whether an over-potential event occurs.

In operation 312, the charging current determining apparatus verifies whether an over-potential $V_{ov}$ is less than a preset over-potential $V_b$. $V_{ov}$ denotes a difference between a pulse voltage $V_p$ of the battery charged during the target charging operation and a relaxation voltage $V_r$ sensed during a charging rest time of the target charging operation.

Examples of $V_b$ are listed in Table 2. However, examples are not limited thereto.

TABLE 2

| | N = 1 | N = 2 | N = 3 | N = 4 | N = 5 | N = 6 | N = 7 | N = 8 |
|---|---|---|---|---|---|---|---|---|
| $V_b(V)$ | 0.69 | 0.4 | 0.353 | 0.353 | 0.298 | 0.21 | 0.16 | 0.13 |

$V_b$ is a value set separately for each charging operation. Further, $V_b$ of a predetermined charging operation differs from $V_b$ of another charging operation. As an index of the charging operation increases, $V_b$ decreases.

For example, in a case in which N of the target charging operation corresponds to "3", the charging current determining apparatus compares $V_{ov}$ to 0.353 V.

In response to verification that $V_{ov}$ is greater than or equal to $V_b$, in operation 330, the charging current determining apparatus determines $I_{M+1,N}$ to be $I_{M,N}-I_s$. In the case in which the lithium-ion battery is charged based on the pulse charging mode, a concentration of lithium ions is relatively high on a surface of the cathode of the lithium-ion battery, as described with reference to FIG. 2. In accordance with one embodiment, the comparison between $V_{ov}$ and $V_b$ is performed to prevent the concentration of lithium ions from being greater than or equal to a predetermined concentration in a subsequent charging cycle. In response to verification of $V_{ov}$ being less than $V_b$, the charging current determining apparatus verifies whether a ratio event occurs.

In operation 313, the charging current determining apparatus verifies whether a ratio of the variance $\Delta V_{ov}$ in the over-potential to the variance $\Delta V_r$ in the relaxation voltage is less than a predetermined ratio c. The charging current determining apparatus obtains data related to the over-potential of the battery charged during the target charging operation and data related to the relaxation voltage of the battery. The charging current determining apparatus calculates $\Delta V_{ov}$ indicating the variance in the over-potential during the target charging operation. Further, the charging current determining apparatus calculates $\Delta V_r$ indicating the variance in the relaxation voltage during the target charging operation. The charging current determining apparatus calculates a ratio of $\Delta V_{ov}$ to $\Delta V_r$, and verifies whether the calculated ratio is less than c.

Examples of c are listed in Table 3. However, examples are not limited thereto.

TABLE 3

| | N = 1 | N = 2 | N = 3 | N = 4 | N = 5 | N = 6 | N = 7 | N = 8 |
|---|---|---|---|---|---|---|---|---|
| c | −0.5 | 0.03 | 0.05 | 0.05 | 0.06 | 0.15 | 0.2 | 0.5 | c is a value set separately for each charging operation. Further, c of a predetermined charging operation differs from c of another charging operation. As an index of the charging operation increase, c increases.

For example, in a case in which N of the target charging operation corresponds to "3", the charging current determining apparatus compares the ratio to "0.05".

In response to verifying that the ratio is less than c, in operation 320, the charging current determining apparatus determines $I_{M+1,N}$ to be $I_{M,N}$. Conversely, in response to verifying that the ratio is greater than or equal to c, in operation 330, the charging current determining apparatus determines $I_{M+1,N}$ to be $I_{M,N}-I_s$. The corresponding current value is determined to be less than the current value. In the case in which the lithium-ion battery is charged based on the pulse charging mode, a concentration of lithium ions is relatively high on a surface of the cathode of the lithium-ion battery. The comparison between the ratio and c is performed to prevent a rate of increase in the concentration of lithium ions from being greater than or equal to a predetermined concentration in a subsequent charging cycle.

In a case in which at least one of the voltage event, the over-potential event, and the ratio event occurs, the charging current determining apparatus determines that the corresponding current value is less than the current value of the target charging operation. In a case in which the voltage event, the over-potential event, and the ratio event do not occur, the charging current determining apparatus determines that the corresponding value is equal to the current value of the target charging operation.

In the example of FIG. 3, whether the over-potential event occurs is verified depending on whether the voltage event occurs, and whether the ratio event occurs is verified depending on whether the over-potential event occurs. However, the example of FIG. 3 is provided as an example of one embodiment. The charging current determining apparatus verifies whether each of the voltage event, the over-potential event, and the ratio event occurs, irrespective of whether a predetermined event occurs.

In response to the corresponding current value being determined, the charging current determining apparatus updates the index N of the charging operation, in operation 340. In operation 350, the charging current determining apparatus verifies whether the updated N is greater than or equal to the number $N_s$ of charging operations. In response to verification that the updated N is less than $N_s$, the charging current determining apparatus re-executes operation 310. Conversely, in response to verifying that the updated N is greater than or equal to $N_s$, in operation 360, the charging current determining apparatus updates an index M of the charging cycle. In operation 370, the charging current determining apparatus verifies whether the updated M is greater than or equal to a number $M_c$ of charging cycles. In response to verifying that the updated M is less than $M_c$, the charging current determining apparatus re-executes operation 310.

A current value of each of a plurality of charging operations included in an (M+1)-th charging cycle is determined before the (M+1)-th charging cycle is initiated. In response to the (M+1)-th charging cycle being initiated, the battery charging apparatus determines a start operation of the (M+1)-th charging cycle. The battery charging apparatus charges the battery at a current value of the start operation. In an example, the current value of the start operation is a value determined by the charging current determining apparatus.

The descriptions provided with reference to FIGS. 1 and 2 are applicable to the matters described with reference to FIG. 3, and thus duplicated descriptions will be omitted for conciseness.

Figure 4:
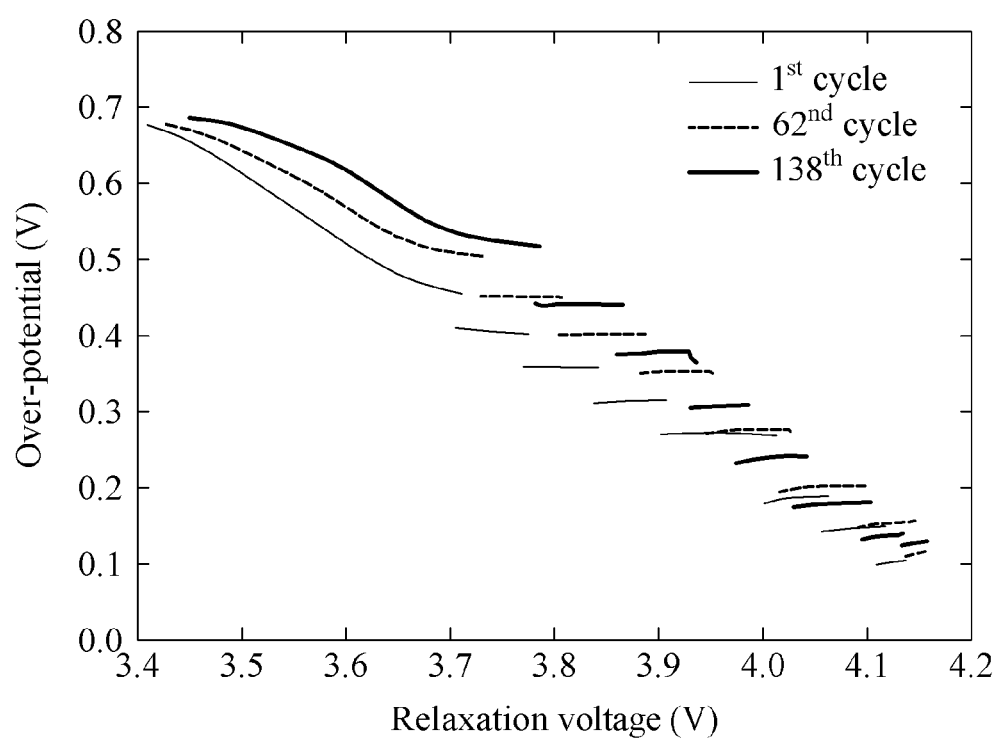
FIG. 4 is a graph illustrating an example of an over-potential and a relaxation voltage of a battery, in accordance with an embodiment.

FIG. 4 is a graph illustrating an example of an over-potential and a relaxation voltage of a battery, in accordance with an embodiment.

A charging current determining apparatus obtains data related to a relaxation voltage of a battery charged during a target charging operation and data related to an over-potential of the battery. The charging current determining apparatus calculates $\Delta V_{ov}$ which is a difference between a maximum over-potential and a minimum over-potential. Further, the charging current determining apparatus calculates $\Delta V_r$, which is a difference between a maximum relaxation voltage and a minimum relaxation voltage. The charging current determining apparatus calculates $\Delta V_{ov}/\Delta V_r$. In the graph of FIG. 4, $\Delta V_{ov}/\Delta V_r$ indicates an average gradient.

The charging current determining apparatus verifies a ratio c predetermined as shown in Table 3 based on an index of the target charging operation, and compares c and $\Delta V_{ov}/\Delta V_r$.

Referring to FIG. 4, as an index of a charging cycle increases, the over-potential of the battery is controlled within a predetermined level. Although the index of the charging cycle increases, respective maximum over-potentials of charging cycles are substantially the same. Similarly, although the index of the charging cycle increases, respective minimum over-potentials of the charging cycles are substantially the same. Thus, although the index of the charging cycle increases, $\Delta V_{ov}$ is substantially the same, and thus the over-potential of the battery is controlled within the predetermined level.

The descriptions provided with reference to FIGS. 1 and 3 are applicable to the matters described with reference to FIG. 4, and thus duplicated descriptions will be omitted for conciseness.

FIG. 5 illustrates an example of a charging current determining method, in accordance with an embodiment.

Hereinafter, an N-th charging operation of an M-th charging cycle is expressed as (M, N).

Referring to FIG. 5, a charging current determining apparatus determines a current value of (M+1, N) based on a current value of (M, N).

The charging current determining apparatus verifies whether physical quantity data corresponding to (M, 1) is present. In the example of FIG. 5, physical quantity data corresponding to (M, 1) is absent. In this example, the charging current determining apparatus determines a current value $I_{M+1,1}$ of (M+1, 1) to be $I_{M,1}$.

In response to $I_{M+1,1}$ being determined, the charging current determining apparatus verifies whether physical quantity data corresponding to (M, 2) is present. In the example of FIG. 5, the physical quantity data corresponding to (M, 2) is absent. In this example, the charging current determining apparatus determines a current value $I_{M+1,2}$ of (M+1, 2) to be $I_{M,2}$.

Physical quantity data corresponding to each of (M, 1) and (M, 2) is absent. In the example of FIG. 5, a charging start operation of an M-th charging cycle is (M, 3). Accordingly, physical quantity data corresponding to each of (M, 1) and (M, 2) is absent.

In response to $I_{M+1,2}$ being determined, the charging current determining apparatus verifies whether physical quantity data corresponding to (M, 3) is present. Because the physical quantity data corresponding to (M, 3) is present, the charging current determining apparatus verifies whether a current change event occurs based on the physical quantity data corresponding to (M, 3). The current change event has been previously described, and thus duplicated descriptions will be omitted for conciseness. In response to verification that the current change event occurs, the charging current determining apparatus determines a current value $I_{M+1,3}$ of (M+1, 3) to be $I_{M,3}-I_s$. In this example, $I_{M+1,3}=I_{M,3}-I_s$ is satisfied. In response to verification that the current change event does not occur, the charging current determining apparatus determines the current value $I_{M+1,3}$ of (M+1, 3) to be $I_{M,3}$. In this example, $I_{M+1,3}=I_{M,3}$ is satisfied.

Further, the M-th charging cycle is a partial charging cycle. A battery is partially charged, rather than being fully charged. Thus, the physical quantity data corresponding to each of an $(N_s-1)$-th charging operation and an $N_s$-th charging operation is absent.

Because the physical quantity data corresponding to (M, $N_s-1$) is absent, the charging current determining apparatus determines a current value $I_{M+1,Ns-1}$ of (M+1, $N_s-1$) to be $I_{M,Ns-1}$. In this example, $I_{M+1,Ns-1}=I_{M,Ns-1}$ is satisfied. Similarly, because the physical quantity data corresponding to (M, $N_s$) is absent, the charging current determining apparatus determines a current value $I_{M+1,Ns}$ of (M+1, $N_s$) to be $I_{M,Ns}$. In this example, $I_{M+1,Ns}=I_{M,Ns}$ is satisfied.

In an example, as an index of the charging cycle increases, a current value of a operation of the charging cycle decreases. Each of the plurality of charging cycles has a different charging profile. Thus, the battery degrades at a relatively slow rate, and the life of the battery increases.

Figure 6:
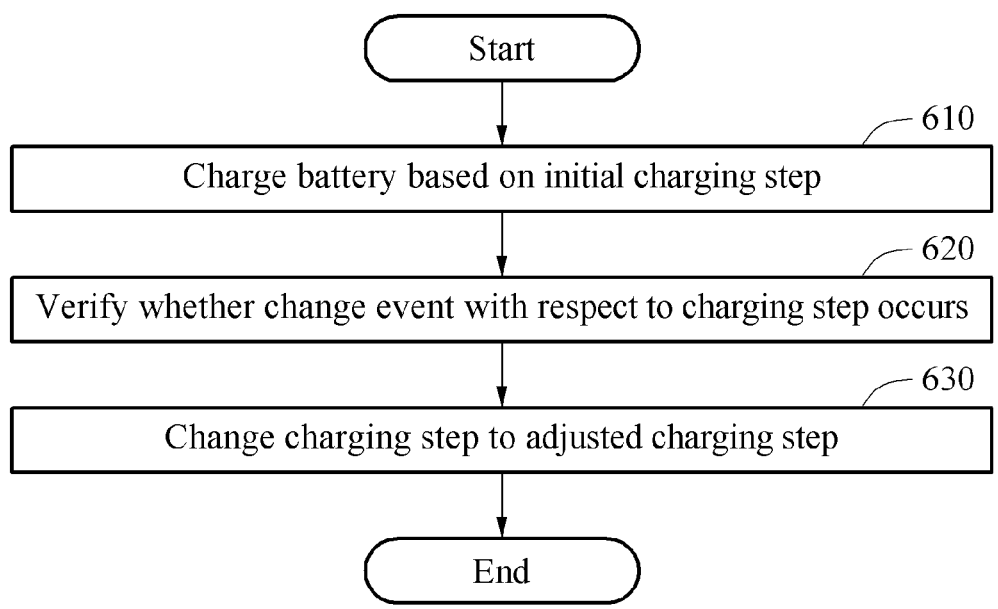
FIG. 6 is a flowchart illustrating another example of a battery charging method, in accordance with an embodiment.

FIG. 6 is a flowchart illustrating another example of a battery charging method, in accordance with an embodiment.

Referring to FIG. 6, in operation 610, a battery charging apparatus charges a battery based on an initial charging operation. The battery charging apparatus applies a pulse charging mode to quickly charge the battery. In a case in which the pulse charging mode is applied, the battery charging apparatus charges the battery at a first current value, based on the initial charging operation.

In operation 620, the battery charging apparatus verifies whether a change event with respect to a charging operation occurs. The change event includes at least one of a physical quantity event in which a physical quantity of the battery sensed during a charging rest time of the initial charging operation is greater than or equal to a threshold physical quantity, and a time event in which a charging time of the battery is greater than or equal to a duration corresponding to the initial charging operation.

In response to verification that the change event occurs, in operation 630, the battery charging apparatus changes the charging operation to an adjusted charging operation. The initial charging operation corresponds to (M, N). In a case in which the change event occurs, the battery charging apparatus changes the charging operation to an adjusted charging operation (M, N+1). The battery charging apparatus charges the battery at a second current value of the adjusted charging operation. In one example, the second current value is less than the first current value.

In an example, the first current value is a value determined before the initial charging operation is initiated. The first current value is determined based on a current value of (M−1, N). In detail, a charging current determining apparatus verifies whether physical quantity data corresponding to (M−1, N) is present. In response to verification that the physical quantity data corresponding to (M−1, N) is present, the charging current determining apparatus verifies whether a current change event occurs based on the physical quantity data. In response to verification that the current change event does not occur, the charging current determining apparatus determines the first current value to be equal to the current value of (M−1, N). In response to verification that the current change event occurs, the charging current determining apparatus determines the first current value to be less than the current value of (M−1, N). The current change event includes at least one of a voltage event, an over-potential event, and a ratio event. The current change event is already described above, and thus duplicated descriptions will be omitted for conciseness.

Similarly, the second current value is a value determined before the adjusted charging operation is initiated. The second current value is determined based on a current value of (M−1, N+1). The second current value is less than or equal to the current value of (M−1, N+1).

The initial charging operation and the adjusted charging operation are included in the pulse charging mode in which a pulse current is applied to the battery. In this example, a pulse current having the first current value is applied to the battery during the initial charging operation, and a pulse current having the second current value is applied to the battery during the adjusted charging operation.

The battery charging apparatus and the charging current determining apparatus are logically implemented in a single physical apparatus. Further, the battery charging apparatus and the charging current determining apparatus are physically distinct apparatuses.

The descriptions provided with reference to FIGS. 1 through 5 are applicable to the matters described with reference to FIG. 6, and thus duplicated descriptions will be omitted for conciseness.

Figure 7:
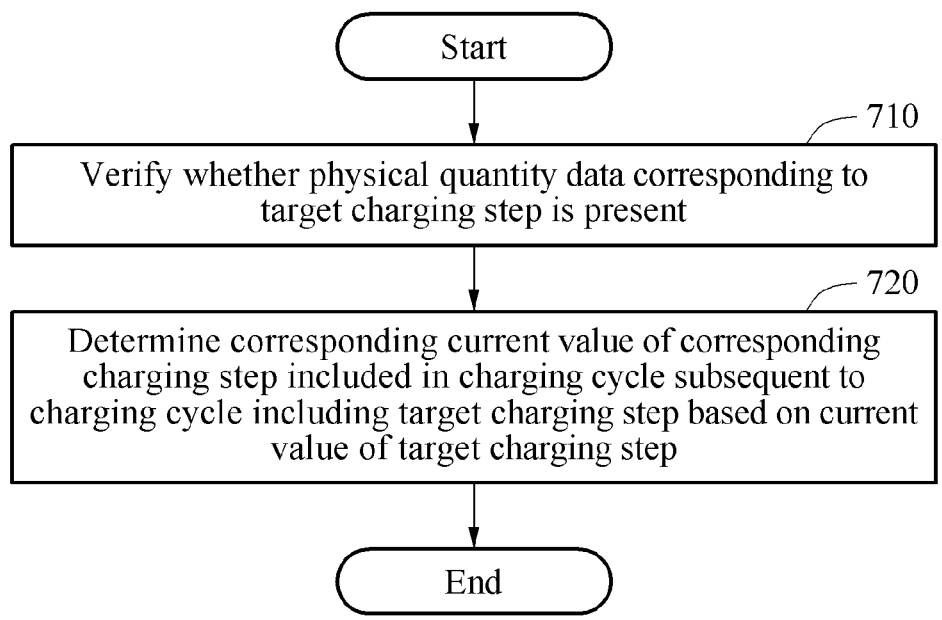
FIG. 7 is a flowchart illustrating another example of a charging current determining method, in accordance with an embodiment.

FIG. 7 is a flowchart illustrating another example of a charging current determining method, in accordance with an embodiment.

Referring to FIG. 7, in operation 710, a charging current determining apparatus verifies whether physical quantity data corresponding to a target charging operation is present.

In operation 720, the charging current determining apparatus determines a corresponding current value of a corresponding charging operation based on a current value of the target charging operation. The corresponding charging operation is a charging operation corresponding to the target charging operation. The corresponding charging operation is included in a charging cycle subsequent to a charging cycle including the target charging operation. In a case in which the target charging operation corresponds to (M, N), the corresponding charging operation corresponds to (M+1, N).

In response to verifying that the physical quantity data corresponding to the target charging operation is absent, the charging current determining apparatus determines the corresponding current value to be equal to the current value of the target charging operation.

In response to verifying that the physical quantity data corresponding to the target charging operation is present, the charging current determining apparatus verifies whether a current change event occurs based on the physical quantity data. In response to verifying that the current change event occurs, the charging current determining apparatus determines the corresponding current value to be less than the current value of the target charging operation. In response to verifying that the current change event does not occur, the charging current determining apparatus determines the corresponding current value to be equal to the current value of the target charging operation.

In a case in which (M+1, N) is initiated, the battery charging apparatus charges the battery at the corresponding current value.

In an example, the target charging operation is included in the pulse charging mode in which a pulse current is applied to a battery. Similarly, the corresponding charging operation is included in the pulse charging mode. In a case in which (M+1, N) is initiated, the battery charging apparatus charges the battery with a pulse current having the corresponding current value.

The descriptions provided with reference to FIGS. 1 through 6 are applicable to the matters described with reference to FIG. 7, and thus duplicated descriptions will be omitted for conciseness.

Figure 8:
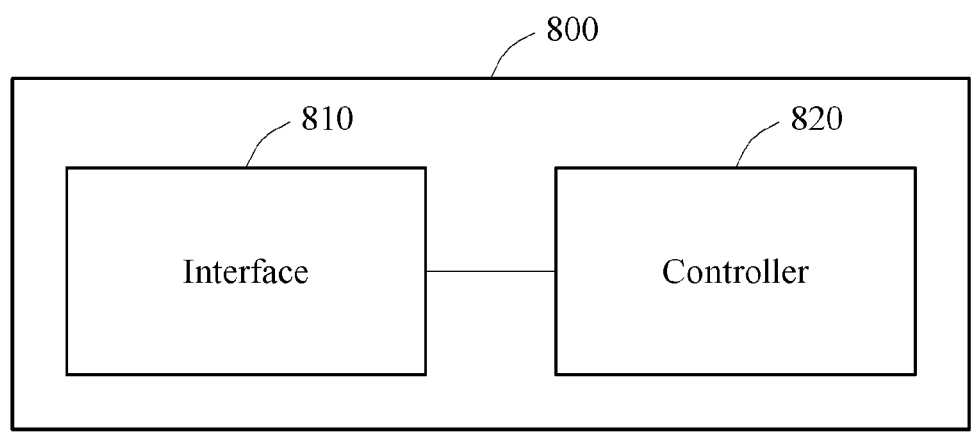
FIG. 8 is a block diagram illustrating an example of a battery charging apparatus, in accordance with an embodiment.

FIG. 8 is a block diagram illustrating an example of a battery charging apparatus, in accordance with an embodiment.

A battery charging apparatus 800 that performs the operations described herein with respect to FIGS. 1 and 6 are implemented by hardware components. Examples of hard ware components include chips, micro-chips, controllers, sensors, generators, drivers, memories, comparators, arithmetic logic units, adders, subtractors, multipliers, dividers, integrators, and any other electronic components known to one of ordinary skill in the art. In on e example, the hardware components are implemented by computing hardware, for example, by one or more processors or computers. A processor or computer is implemented by one or more processing elements, such as an array of logic gates, a controller and a n arithmetic logic unit, a digital signal processor, a microcomputer, a programmable logic controller, a field-programmable gate array, a programmable logic array, a microprocessor, or any other device or combination of devices known to one of ordinary skill in the art th at is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1 and 6. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, example s of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Referring to FIG. 8, the battery charging apparatus 800 includes an interface 810, and a controller 820.

The interface 810 receives a sensed physical quantity of a battery.

The controller 820 charges the battery based on an initial charging operation.

The controller 820 verifies whether a change event with respect to a charging operation occurs. The controller 820 changes the charging operation to an adjusted charging operation in response to verification that the change event with respect to the charging operation occurs.

The descriptions provided with reference to FIGS. 1 through 7 are applicable to the matters described with reference to FIG. 8, and thus duplicated descriptions will be omitted for conciseness.

Figure 9:
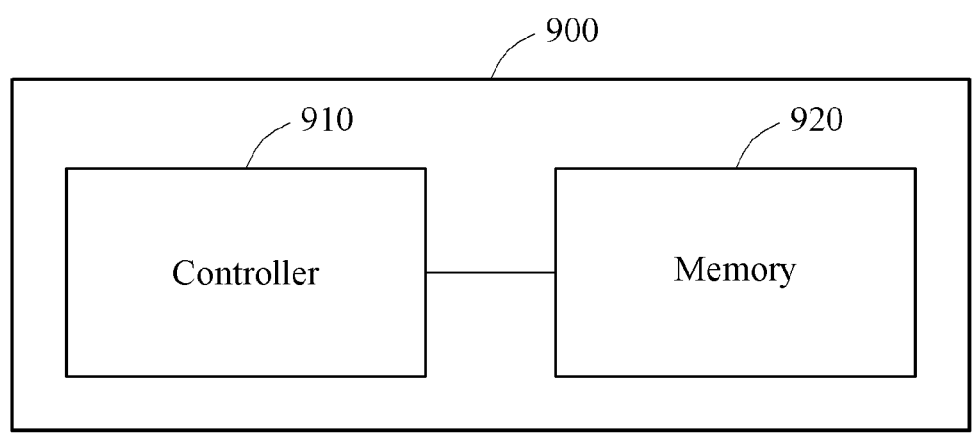
FIG. 9 is a block diagram illustrating an example of a charging current determining apparatus, in accordance with an embodiment.

FIG. 9 is a block diagram illustrating an example of a charging current determining apparatus, in accordance with an embodiment.

A charging current determining apparatus 900 that performs the operations described herein with respect to FIGS. 3, 5, and 7 are implemented by hardware components. Examples of hardware components include chips, microchips, controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3, 5, and 7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Referring to FIG. 9, the charging current determining apparatus 900 includes a controller 910, and a memory 920.

The controller 910 verifies whether physical quantity data corresponding to a target charging operation is present.

The controller 910 determines a corresponding current value of a corresponding charging operation based on a current value of the target charging operation.

The memory 920 stores the corresponding current value.

In an example, the charging current determining apparatus 900 transmits the corresponding current value to a battery charging apparatus. For example, the charging current determining apparatus 900 includes a wireless communication interface and/or a wired communication interface. The charging current determining apparatus 900 transmits the corresponding current value to the battery charging apparatus through the wireless communication interface and/or the wired communication interface.

The descriptions provided with reference to FIGS. 1 through 8 are applicable to the matters described with reference to FIG. 9, and thus duplicated descriptions will be omitted for conciseness.

Figure 10:
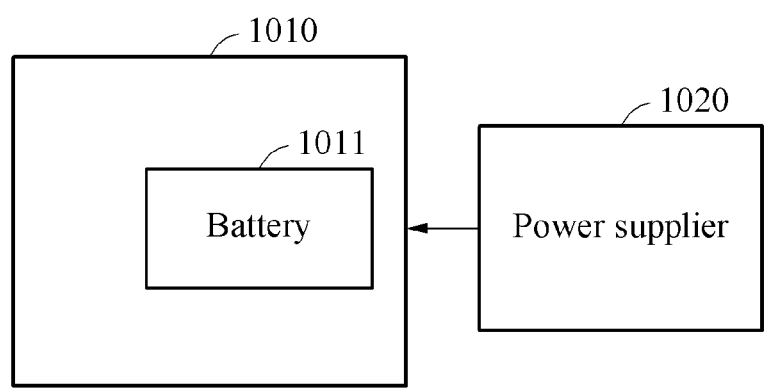
FIG. 10 is a block diagram illustrating an example of a charging system, in accordance with an embodiment.

FIG. 10 is a block diagram illustrating an example of a charging system, in accordance with an embodiment.

Referring to FIG. 10, a charging system includes a physical application device 1010, and a power supplier 1020. The physical application device 1010 includes structural terminals such as a smartphone, a laptop computer, a tablet personal computer (PC), for example. Further, the physical application device 1010 includes an electric moving body. The examples of the physical application device 1010 are provided as examples. Other examples may be implemented of the physical application device 1010 without departing from the intended scope. However, examples are not limited thereto.

Although FIG. 10 illustrates the physical application device 1010 including a battery 1011, examples are not limited thereto. For example, the battery 1011 may be a separate structural device from the physical application device 1010.

In an example, a battery charging apparatus is included in the power supplier 1020. The power supplier 1020 supplies power to the physical application device 1010, and the battery 1011 is charged. In one example, the power supplier 1020 provides the power to the physical application device 1010 in a wired and/or wireless manner.

The power supplier 1020 supports a fast charging mode. The fast charging mode includes the pulse charging mode described above.

The descriptions provided with reference to FIGS. 1 through 9 are applicable to the matters described with reference to FIG. 10, and thus duplicated descriptions will be omitted for conciseness.

The physical application device 1010, the battery 1011, and the power supplier 1020 are examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery charging method, comprising:
    charging a battery based on a first charging operation profile of plural charging operation profiles in a charging cycle, the plural charging operation profiles using a pulse charging mode;
    verifying whether a change event, with respect to a charging operation, occurs based on the charging of the battery, the change event comprising any one or any combination of a time event and a physical quantity event; and
    changing the charging operation to a second charging operation profile, of the plural charging operation profiles, in response to verifying that the change event, with respect to the charging operation, occurs,
    wherein a charging current value of a subsequent charging cycle is determined based on a preset value and a charging current value of the charging cycle in response to one of conditions being satisfied, the conditions including a first condition in which a maximum voltage of the battery is greater than or equal to a preset voltage, a second condition in which an over-potential of the battery is greater than or equal to a preset over-potential, and a third condition in which a ratio of a variance in the over-potential to a variance in a relaxation voltage of the battery is greater than or equal to a preset ratio.

2. The battery charging method of claim 1, wherein a current value of the second charging operation profile is less than a current value of the first charging operation profile.

3. The battery charging method of claim 1, wherein, as the change event, the time event is a change event in which a charging time of the battery is greater than or equal to a duration corresponding to the first charging operation profile, and
    wherein the physical quantity event is a change event in which a physical quantity of the battery sensed during a charging rest time of the first charging operation profile is greater than or equal to a threshold physical quantity.

4. The battery charging method of claim 3, wherein the sensed physical quantity comprises a voltage sensed during the charging rest time.

5. The battery charging method of claim 3, wherein the sensed physical quantity comprises a physical quantity sensed during the charging rest time after the battery is discharged.

6. The battery charging method of claim 3, wherein the changing of the charging operation comprises terminating the charging of the battery based on the first charging operation profile in response to the sensed physical quantity being greater than or equal to the threshold physical quantity.

7. The battery charging method of claim 1, further comprising:
    charging the battery in a slow charging mode prior to the battery being charged based on the first charging operation profile using the pulse charging mode.

8. The battery charging method of claim 7, wherein the charging of the battery in the slow charging mode comprises:
    comparing another sensed physical quantity of the battery to a preset physical quantity, and
    in response to the other sensed physical quantity exceeding the preset physical quantity, determining a start operation of the charging operation based on the other sensed physical quantity and charging the battery with a constant current for a period of time,
    wherein, in response to the period of time expiring, the charging of the battery based on the first charging operation profile comprises charging the battery based on the first charging operation profile determined to be the start operation.

9. The battery charging method of claim 7, wherein the charging of the battery in the slow charging mode comprises:
    comparing another sensed physical quantity of the battery to a preset physical quantity; and
    in response to the other sensed physical quantity being less than or equal to the preset physical quantity, charging the battery with a constant current,
    wherein, in response to the other sensed physical quantity of the battery charged with the constant current exceeding the preset physical quantity, the charging of the battery based on the first charging operation profile comprises charging the battery based on the first charging operation profile.

10. The battery charging method of claim 1, wherein the first charging operation profile and the second charging operation profile are included in and/or using a pulse charging mode, in which a pulse current is applied to the battery.

11. The battery charging method of claim 1, further comprising:
    in response to verifying that the time event occurs as the change event, changing the charging operation from the first charging operation profile to the second charging operation profile, and charging the battery based on the second charging operation profile; and
    in response to verifying that the time event, with respect to the charging operation, does not occur, verifying whether the physical quantity event occurs, wherein the method further comprising, in response to verifying that the physical quantity event occurs as the change event, changing the charging operation from the first charging operation profile to the second charging operation profile, and charging the battery based on the second charging operation profile.

12. A charging current determining method, comprising:
verifying whether physical quantity data corresponding to a first charging operation profile, from among plural charging operation profiles, of a present charging cycle exists, the present charging cycle including the plural charging operation profiles;
in response to verification that the physical quantity data does not exist, determining a corresponding current value of a corresponding charging operation profile, from another plural charging operation profiles, of a subsequent charging cycle, based on a current value of the first charging operation of the present charging cycle,
wherein the subsequent charging cycle is subsequent to the present charging cycle and includes the other plural charging operation profiles; and
in response to verifying that the physical quantity data exists, determining whether a current change event occurs based on the physical quantity data, and determining the corresponding current value of the corresponding charging operation profile of the subsequent charging cycle based on a result of the determination,
wherein the current change event comprises at least one of:
a voltage event in which a maximum voltage of the battery is greater than or equal to a preset voltage,
an over-potential event in which the over-potential is greater than or equal to a preset over-potential, and
a ratio event in which a ratio of a variance in the over-potential to a variance in the relaxation voltage is greater than or equal to a preset ratio.

13. The charging current determining method of claim 12, further comprising:
determining an over-potential indicating a difference between a voltage of the battery and a relaxation voltage sensed during a charging rest time of the first charging operation profile based on the physical quantity data.

14. The charging current determining method of claim 12, wherein
in response to verifying that the current change event occurs, the corresponding current value of the corresponding charging operation profile of the subsequent charging cycle is determined to be less than the current value of the first charging operation profile of the present charging cycle, and
in response to verification that the current change event does not occur, the corresponding current value is determined to be equal to the current value of the first charging operation profile.

15. The charging current determining method of claim 12, wherein, in response to verification that the physical quantity data does not exist, the corresponding current value of the corresponding charging operation profile of the subsequent charging cycle is determined to be equal to the current value of the first charging operation profile of the present charging cycle.

16. The charging current determining method of claim 12, wherein the first charging operation profile and the corresponding charging operation profile are included in and/or using a pulse charging mode in which a pulse current is applied to a battery, and
wherein the corresponding charging operation profile, of the subsequent charging cycle, corresponds to the first charging operation profile of the present charging cycle.

17. A battery charging apparatus, comprising:
a controller configured to:
charge a battery based on a first charging operation profile of plural charging operation profiles in a charging cycle, the plural charging operation profiles using a pulse charging mode;
verify whether a change event with respect to a charging operation occurs based on the charging of the battery, the change event comprising a ratio event and a physical quantity event; and
change the charging operation to a second charging operation profile, of the plural charging operation profiles, in response to verifying that the change event with respect to the charging operation occurs,
wherein a charging current value of a subsequent charging cycle is determined based on a preset value and a charging current value of the charging cycle in response to one of conditions being satisfied, the conditions including a first condition in which a maximum voltage of the battery is greater than or equal to a preset voltage, a second condition in which an over-potential of the battery is greater than or equal to a preset over-potential, and a third condition in which a ratio of a variance in the over-potential to a variance in a relaxation voltage of the battery is greater than or equal to a preset ratio.

18. The battery charging apparatus of claim 17, further comprising:
an interface configured to receive a sensed physical quantity of a battery,
wherein, as the change event, the ratio event is an event in which a ratio of a difference between a maximum over-potential and a minimum over-potential, and a difference between a maximum relaxation voltage and a minimum relaxation voltage is greater than or equal to a threshold ratio,
the relaxation voltage being a voltage of the battery sensed during a charging rest time of a corresponding charging operation, and the over-potential being a difference between a voltage of the battery charged based on the corresponding charging operation and the relaxation voltage, and
wherein, as the change event, the physical quantity event is an event in which a physical quantity of the battery sensed during a charging rest time of the first charging operation profile is greater than or equal to a threshold physical quantity.

\* \* \* \* \*